United States Patent
Wilkinson et al.

(10) Patent No.: US 10,064,346 B2
(45) Date of Patent: Sep. 4, 2018

(54) METHOD AND APPARATUS FOR GROWING LIFE FORMS UNDER REMOTE INFLUENCE

(71) Applicants: Lydia Wilkinson, Etobicoke (CA); Kathryn Wilkinson, Mississauga (CA)

(72) Inventors: Lydia Wilkinson, Etobicoke (CA); Kathryn Wilkinson, Mississauga (CA)

(*) Notice: Subject to any disclaimer, the term of this patent is extended or adjusted under 35 U.S.C. 154(b) by 253 days.

(21) Appl. No.: 14/656,917

(22) Filed: Mar. 13, 2015

(65) Prior Publication Data
US 2015/0261197 A1 Sep. 17, 2015

Related U.S. Application Data

(60) Provisional application No. 61/952,541, filed on Mar. 13, 2014.

(51) Int. Cl.
G05B 13/00 (2006.01)
G05D 23/00 (2006.01)
A01G 9/24 (2006.01)

(52) U.S. Cl.
CPC .............. A01G 9/24 (2013.01); Y02A 40/264 (2018.01)

(58) Field of Classification Search
None
See application file for complete search history.

(56) References Cited

U.S. PATENT DOCUMENTS

| | | | | |
|---|---|---|---|---|
| 5,646,863 A * | 7/1997 | Morton | .................. | G01N 33/18 210/688 |
| 8,982,217 B1 * | 3/2015 | Hickman | ............... | H04N 7/185 348/158 |
| 2004/0230486 A1 * | 11/2004 | Greenlee | ................ | G06Q 30/02 705/15 |
| 2011/0035059 A1 * | 2/2011 | Ersavas | ................ | A01G 25/167 700/276 |
| 2012/0210640 A1 * | 8/2012 | Ivanovic | .................. | A01G 9/24 47/58.1 LS |
| 2012/0268292 A1 * | 10/2012 | Rock | ........................ | H04Q 9/00 340/870.03 |
| 2013/0226347 A1 * | 8/2013 | Martinez | .............. | G05D 11/138 700/266 |
| 2014/0120972 A1 * | 5/2014 | Hartman | ............... | H04W 88/02 455/509 |
| 2014/0200690 A1 * | 7/2014 | Kumar | ................... | A01G 22/00 700/90 |
| 2014/0202077 A1 * | 7/2014 | Nishiura | ................ | A01G 1/001 47/66.7 |

FOREIGN PATENT DOCUMENTS

CN 1644018 A * 7/2005
JP 2005009847 A * 1/2005

* cited by examiner

*Primary Examiner* — Kenny S Lin
(74) *Attorney, Agent, or Firm* — Stuart L. Wilkinson (57) ABSTRACT

A remote site has an associated state monitoring sub-system for monitoring environmental conditions of a remote site. A local site has an associated state generating sub-system for setting environmental conditions for life forms at the local site. A communication link connects the sub-systems. In response, to monitoring the state of an environmental condition at the remote site, a corresponding environmental condition is generated at the local site which depends on the monitored state.

12 Claims, 4 Drawing Sheets

METHOD AND APPARATUS FOR GROWING LIFE FORMS UNDER REMOTE INFLUENCE

CROSS REFERENCE TO RELATED PATENTS

The present application claims priority pursuant to 35 U.S.C. § 119(e) to U.S. Provisional Application Ser. No. 61/952,541 entitled "Method and apparatus for growing life forms under remote influence" filed Mar. 13, 2014, the disclosure of which application is hereby incorporated herein by reference in its entirety and made part of the present application for all purposes.

FIELD OF THE INVENTION

This invention relates to a method and apparatus for growing living organisms, such as flora and fauna, under a remote influence and has particular but not exclusive application to a growing installation to be maintained and displayed within a building.

DESCRIPTION OF RELATED ART

The Earth and other parts of the universe show massive diversity. Consider that a region on Earth may be a desert, a rain forest, a perennial garden, an alpine slope, an underwater reef, an animal range, an insect or microbe environment, or something altogether different. Any such region is unique. It will normally have life forms—species of flora and fauna—that, in character, variety and frequency are different at any time from the character variety and frequency of flora and fauna of any other region. Moreover, the character, variety and frequency of flora and fauna in the region inevitably change with time.

This is something that we like to see and experience. We go to see leaves change colour in autumn, to watch ice break up in the spring, to watch monkeys play in the zoo, and to hear waves crashing on the beach. Generally, if we want to experience such a region, we must go there in person which is expensive in terms of environmental pressure. We can, alternatively, remain at home, and see our local region which will probably itself be rich in flora and fauna. But it is our local region and because we experience it often, it will inevitably lack novelty interest. We can generate or attend specific and limited representations of a remote region: for example, by keeping a potted plant or going to the city zoo. We can also watch a documentary film of a region featuring its flora and fauna which can be interesting but really lacks the immediacy of being next to living species inhabiting the region.

While these arrangements have value, improvements are possible to enable people to experience aspects of a remote region without journeying there. Limitations and disadvantages of conventional and traditional approaches to representing remote regions will become apparent to one of ordinary skill in the art through comparison of such approaches with the present invention.

According to one aspect of the invention, there is provided a method comprising monitoring a remote site environmental condition, communicating the state of the remote site environmental condition to a control sub-system, operating the control sub-system to generate a local site environmental condition at a local site such that the local site environmental condition depends on the communicated state of the remote site environmental condition, and growing a life form at the local site. The life form can be either a species of flora and fauna.

Preferably, the monitoring of the remote site environmental condition is one of continuous, periodic and intermittent. The local site environmental condition can be generated substantially to match the communicated state of the remote site environmental condition or to have some other relationship to the communicated state. The dependence of the local site environmental condition on the communicated state of the remote site environmental condition can be temporally related, as by the dependent local site environmental condition being one of substantially coincident with and lagging the communicated state of the remote site environmental condition. The monitoring of the remote site environmental condition can be at least one of manually monitoring, automatically monitoring using equipment on the remote site, and automatically monitoring using equipment off the remote site.

Preferably, the remote site environmental condition and the local site environmental condition are at least one of an above-ground state condition, an in-ground state condition and an in-water state condition, the condition being, as applicable to the above-ground, in-ground and in-water environment, at least one of temperature, humidity, precipitation level, precipitation type, light intensity, light direction, light spectral content, pressure, composition, wind or flow direction, wind or flow speed, turbulence, sound, electric field, magnetic field, identity of life forms, frequency of identified life forms, health of identified life forms, and a drastic change being at least one of fire, flood, chemical inundation and biological inundation.

An in-ground state condition can be monitored using a corer to extract a ground core, with the contents of the ground core then being subjected to analysis. In addition or alternatively, the in-ground state environmental condition is monitored non-intrusively by using a detector located immediately above the ground surface.

The method can further comprise generating a forecast state of the remote site environmental condition, and generating the local site environmental condition based, as least in part, on the generated forecast state of the remote site environmental condition. The method can further or alternatively comprise manually controlling the local site environmental condition.

Preferably, the local site includes a chamber, the chamber having inputs for adjusting environmental conditions in the chamber, the chamber having probes for monitoring environmental conditions in the chamber, at least some of the probes having outputs used to modify at least some of the inputs. In one form, the interior of the chamber is substantially sealed from the exterior of the chamber, other than as a result of said inputs. The inputs to the chamber can be configured to adjust environmental conditions in the chamber including at least one of temperature, humidity, precipitation level, precipitation type, light intensity, light direction, light spectral content, pressure, interior composition, wind or flow direction, wind or flow speed, turbulence, sound, electric field, magnetic field, identity of life forms, frequency of identified life forms, health of identified life forms, fire, flood, chemical inundation and biological inundation. For entertainment, at least a part of a defining boundary of the chamber is at least partially transparent to allow viewing of the chamber contents.

According to another aspect of the invention, there is provided a method comprising monitoring a remote site environmental condition, communicating the state of the remote site environmental condition to a control sub-system, operating the control sub-system to generate a local site environmental condition at an experimental site and a control site, each of the experimental and control sites remote from the remote site, the local site environmental condition being dependent on the communicated state of the remote site environmental condition, growing a life form at the experimental site and growing the same species of life form at the control site, generating a change in the local site environmental condition at the experimental site, and comparing at least one property of the species at the local sites to determine whether the effect of the generated change in the local site environmental condition at the experimental local site is a beneficial effect. Preferably, the method further comprises imposing a change in the remote site environmental condition corresponding to the change generated at the experimental local site if the effect of the generated change on the species at the experimental local site is determined to be a beneficial effect.

According to an aspect of the invention, the remote site environmental condition is monitored at a plurality of locations distributed over the site and the communicated state of the remote site environmental condition is a function of position within the volume of the remote site. Alternatively or in addition, the remote site environmental condition is monitored at a plurality of locations distributed over the remote site and the communicated state of the remote site environmental condition is computed based on a blending of the environmental conditions monitored at the plurality of locations.

According to another aspect of the invention, the method can further comprise operating viewing equipment at the remote site to view the remote site environmental condition and to create image data corresponding thereto, and operating image analysis equipment to analyze the image and to identify properties indicative of the remote site environmental condition. The method can utilize a feedback loop from the image analysis equipment to the viewing equipment to adjust the viewing equipment in response to detecting an identified change in the remote site environmental condition. The image analysis software can operate to issue a major image output in response to detecting a drastic change in the remote site environmental condition.

According to another aspect of the invention, there is provided a method comprising monitoring a remote site environmental condition, communicating the state of the remote site environmental condition to a control sub-system, operating the control sub-system to generate a local site environmental condition at a local site that is a control site such that the local site environmental condition depends on the communicated state of the remote site environmental condition, and growing a first life form of a particular species at the control site, the method further comprising, the method further comprising operating the control sub-system to generate the local site environmental condition at an experimental site remote from the remote site such that the local site environmental condition at the experimental site is also dependent on the communicated state of the remote site environmental condition, growing a second life form of the particular species at the experimental site, generating a change in the local site environmental condition at the experimental site, and comparing a property of the first life form at the control site to a corresponding property of the second life form at the experimental site to determine whether the generated change in the local site environmental condition at the experimental site has an effect on the second life form. The method can further comprise implementing a change in the remote site environmental condition corresponding to the change generated at the experimental site if the effect of the generated change on the second life form at the experimental site is determined to be a beneficial effect.

According to another aspect of the invention, there is provided a system comprising a monitoring sub-system for monitoring a remote site environmental condition, a communication path for communicating the state of the remote site environmental condition to a control sub-system, the control sub-system configured to generate a local site environmental condition at a local site such that the local site environmental condition depends on the communicated state of the remote site environmental condition, and a habitat at the local site for growing a life form at the local site. Preferably, the monitoring sub-system includes a timer configured so that the monitoring sub-system monitors the remote site environmental condition over a time that is one of continuous, periodic and intermittent. The control sub-system can be configured to generate the local site environmental condition substantially to match the communicated state of the remote site environmental condition. The control sub-system can be configured temporally to relate the dependence of the local site environmental condition on the communicated state of the remote site environmental condition, as by the dependent local site environmental condition being one of substantially coincident with and lagging the communicated state of the remote site environmental condition.

Preferably the monitoring sub-system is at least one of a person, equipment on the remote site for automatically monitoring the remote site environmental condition, and equipment off the remote site for automatically monitoring the remote site environmental condition. The monitoring subsystem can include at least one probe for use in measuring at least one of an above-ground state condition, an in-ground state condition and an in-water state condition, the probe adapted, as applicable to the above-ground, in-ground and in-water environment, to measure at least one of temperature, humidity, precipitation level, precipitation type, light intensity, light direction, light spectral content, pressure, composition, wind or flow direction, wind or flow speed, turbulence, sound, electric field, magnetic field, identity of life forms, frequency of identified life forms, health of identified life forms, and a drastic change being at least one of fire, flood, chemical inundation and biological inundation.

The control sub-system configured to receive meteorological data applicable to an area including the remote site, and to generate the local site environmental condition based, as least in part, on the received meteorological data.

The local site can include a chamber having inputs for adjusting environmental conditions in the chamber, the chamber having probes for monitoring environmental conditions in the chamber, at least some of the probes having outputs used to modify at least some of the inputs. Preferably, the interior of the chamber is substantially sealed from the exterior of the chamber, other than as a result of said inputs. Preferably, the inputs to the chamber are effective to adjust an environment condition in the chamber, the environmental condition being at least one of temperature, humidity, precipitation level, precipitation type, light intensity, light direction, light spectral content, pressure, interior composition, wind or flow direction, wind or flow speed, turbulence, sound, electric field, magnetic field, identity of life forms, frequency of identified life forms, health of identified life forms, fire, flood, chemical inundation and biological inundation. At least a part of a defining wall of the chamber can be at least partially transparent to allow viewing of the contents of the chamber.

According to another aspect of the invention, the local site is a control site and the life form is a first life form of a particular species, the control sub-system is further operable to generate the local site environmental condition at an experimental site remote from the remote site such that the local site environmental condition at the experimental site is also dependent on the communicated state of the remote site environmental condition, the experimental site having a habitat for growing a second life form of the particular species at the experimental site, the control sub-system operable to generate a change in the local site environmental condition at the experimental site, and a comparator sub-system for comparing a property of the first life form at the control local site to a corresponding property of the second life form at the experimental site to determine whether the generated change in the local site environmental condition at the experimental site has an effect on the second life form. The system can include a feedback loop from the experimental site to the remote site for implementing a change in the remote site environmental condition corresponding to the change generated at the experimental site if the effect of the generated change on the second life form at the experimental site is determined to be a beneficial effect.

BRIEF DESCRIPTION OF THE DRAWINGS

For simplicity and clarity of illustration, elements illustrated in the following figures are not drawn to common scale. For example, the dimensions of some of the elements are exaggerated relative to other elements for clarity. Advantages, features and conditions of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
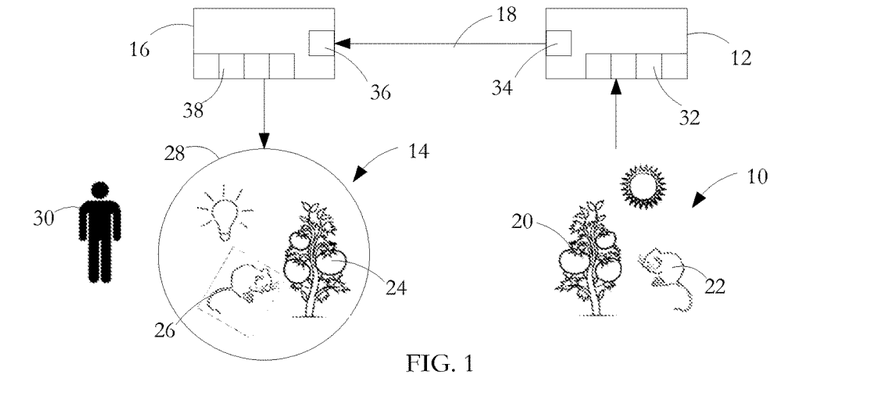
FIG. 1 is a schematic view of apparatus according to an embodiment of the invention.

Referring in detail to FIG. 1, there is shown a remote site 10 having an associated state monitoring sub-system 12, a local site 14 having an associated state generating sub-system 16, and a communication link 18 between the two sub-systems 12, 16. The illustrated remote site 10 appears to be quite sparsely inhabited in terms of flora and fauna. In this example, it contains a single plant 20 and a male mouse 22 called Mickey. The local site 14 also appears to be sparsely inhabited by a plant 24 of the same species and by a mouse 26 called Minnie, also curiously male. At the local site, the plant 24 and Minnie live in a chamber 28 substantially sealed from the outside environment, the chamber enabling the plant 24 and Minnie to be viewed by a person 30 located outside the chamber. Mickey, Minnie and the plants 20, 24 are, in fact, not alone. Although not illustrated in FIG. 1, their respective habitats are defined by many environmental conditions which determine to a large extent how they will live. In this specification, it will be understood that flora and fauna themselves form part of the environmental conditions of a site in which they reside because they affect other co-resident flora and fauna; for example, neighbouring plants fight for the same light.

The remote site monitoring sub-system 12 monitors conditions such as light using a number of monitoring devices 32. The monitoring sub-system 12 may additionally or alternatively use manual monitoring in which a person visits the site and observes and takes note of site properties and conditions. At the sub-system 12, qualitative and quantitative data are generated related to conditions of the remote site 10 and are converted to signals which are sent from a transmitter 34 over the communications link 18. The signals are received at a receiver 36 at the local site 14 where they are analyzed to derive the qualitative and quantitative data related to the remote site conditions. The derived data are used to set corresponding environmental conditions of the local site 14. For this purpose, the local site sub-system 16 has a number of generating units 38, each used for setting a specific condition(s) at the local site 14. The generating sub-system 16 may additionally or alternatively accommodate manual generation of conditions at the local site 14. A control sub-system at the local site is used to set the local site conditions and as an alternative to a dedicated communications link to the remote site can be linked wirelessly to a computer, a phone app or directly to the Internet.

In one embodiment, the remote site conditions data are used, to the extent possible, to generate identical environmental conditions at the local site 14. Also, the matched local site conditions are generated at substantially the same instant as the corresponding conditions are monitored at the remote site 10. Alternatively, the generated local site conditions track the monitored remote site conditions but with a predetermined relationship such as a constant delay. By instituting a delay in the imposed matching of the local to remote site conditions, the local site 14 may be made more convenient for viewing.

Figure 2:
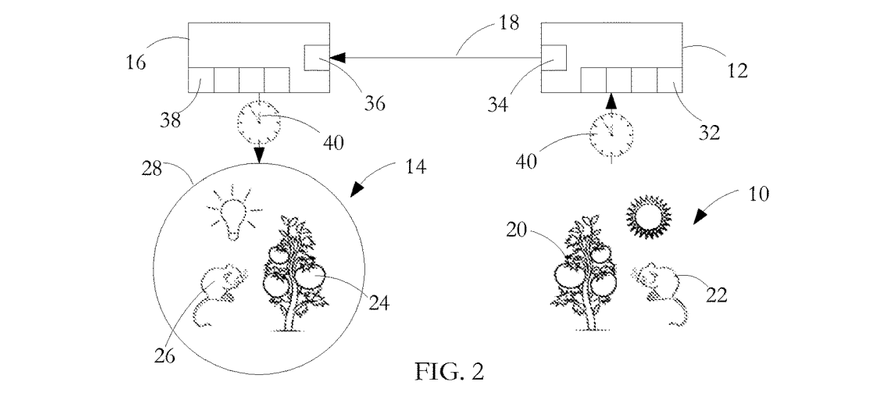
FIG. 2 is a schematic view of the apparatus of FIG. 1, including timing arrangements according to an embodiment of the invention.
Figure 3:
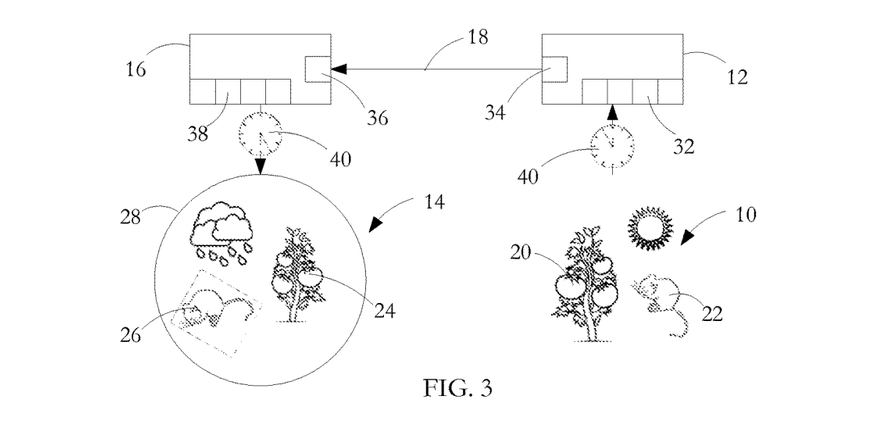
FIG. 3 is a schematic view of the apparatus of FIG. 2, but showing the use of different timing arrangements according to an embodiment of the invention.

As illustrated in FIG. 1, the remote and local sites 10, 14 are "always-on" meaning that, at any time, remote site conditions are being actively monitored and are being used in real time to generate local site conditions. Variations from the always-on operation, as depicted by timers 40 at one or both of the remote and local sites 10, 14, are also possible. In one example, as shown in FIG. 2, remote site conditions are monitored at periodic or intermittent intervals. Such an operation is adopted for example if changes of remote site conditions occur very slowly, or a human agent must journey to the remote site to enable the monitoring activity, or it is not important to have updating of local site conditions done frequently. In a further embodiment related to times of operation, remote site conditions are used to generate local site conditions only after a time lag. For example, as illustrated by FIG. 3, where (a) the remote site is directly the other side of the world from the local site, (b) it is desired that the local site exactly emulates a remote site light condition, and (c) it is desired that emulation of the remote site light condition at noon, remote time, should be experienced at the local site at noon, local time, a local site light condition is generated based on a corresponding monitored remote site light condition, only after a 12 hour time lag. In a further variation, remote site conditions data gathered over a first period—for example, a day of constant monitoring—are used to generate local site conditions over a shorter period—for example, an hour. The remote site monitored conditions data are analyzed to identify, for example, a subset of data showing threshold changes or intermittent changes, and only this subset of data are used in generating the local site conditions. The converse is also possible: i.e., remote site conditions data derived over a short period of time are used to generate conditions over a longer period at the local site 14.

Figure 4:
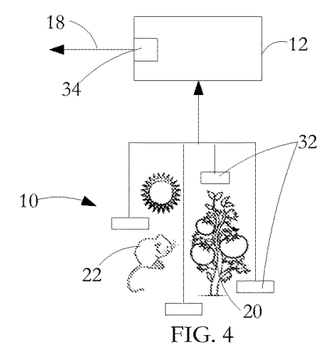
FIG. 4 shows one form of remote site monitoring according to an embodiment of the invention.
Figure 5:
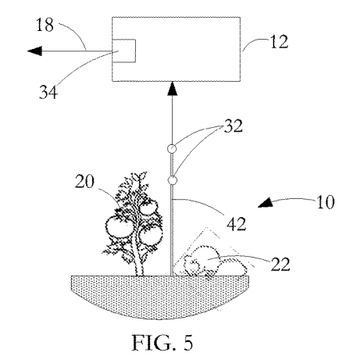
FIG. 5 shows another form of remote site monitoring according to an embodiment of the invention.
Figure 6:
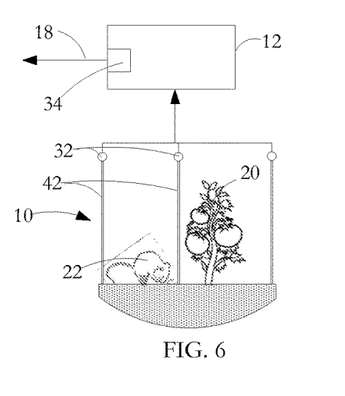
FIG. 6 shows a further form of remote site monitoring including air state monitoring according to an embodiment of the invention.

Referring to FIG. 4, there is shown a remote site 10 having a number of monitoring devices 32 that are used to detect and measure conditions of the site. The devices 32 are located above-ground and may include by way of example, but not limitation, a GPS position detector, an anemometer, a wind vane or sock, an ambient light monitor, a sunlight source (such as a sunshine detector, pyranometer or pyrheliometer), a noise detector, a barometer, a thermometer, a humidity detector, a rainfall gauge, a magnetic field detector, cameras, a gas monitoring unit, and a particle monitoring unit. As shown in FIG. 5, several monitoring devices 32 are mounted on a single supporting pole 42. Similar devices may be mounted at different heights on the pole for monitoring a remote site condition that is height dependent; for example, wind speed at ground level is normally lower than wind speed some distance from the ground. Monitoring devices may be spaced from one another if the presence of one type of monitoring device could affect the accuracy of an adjacent monitoring device of another type. In a variation of the FIG. 5 embodiment as shown in FIG. 6, monitoring devices 32 are mounted at different locations that are laterally distributed over the area of the remote site 10. This is done at a large area site because remote site conditions are likely to differ at locations at opposite boundaries of the area somewhat more than locations at opposite boundaries of a small area.

Figure 7:
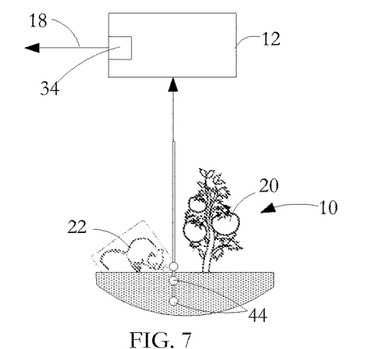
FIG. 7 shows another form of remote site monitoring site including ground state monitoring according to an embodiment of the invention

While the nature and health of flora and fauna depend materially on above-ground conditions, they also depend to some extent on below-ground conditions, this being a direct dependence for flora and more of an indirect dependence for fauna. Referring to FIG. 7, the remote site 10 depicted has a number of monitoring devices 44 that are used to detect and measure below-ground level conditions. Such monitoring devices include by way of example, but not limitation, a moisture detector and a thermometer. Ground based monitoring devices 44 can be sited at different depths and at different lateral positions at the remote site 10 as explained with respect to the above-ground devices 32.

The remote site monitoring devices 32, 44 are generally analog devices. Device outputs are converted to digital data which includes identification of the property being measured and the conditions data related to that property. Digital data derived from the monitoring devices 32, 44 are multiplexed together and sent as packet data over the communication link 18 to be subjected to demultiplexing and regeneration of the monitoring devices output data at the local site 14. The regenerated data are used to develop inputs to the various generating units 38 at the local site 14 for setting corresponding conditions at that site.

In one embodiment of the invention, outputs from spaced remote site monitoring devices 32, 44 are maintained as separate data streams and used individually to set conditions at correspondingly spaced local site positions. Alternatively, inputs from several spaced remote site monitoring devices 32, 44 are blended to produce a mean value or some other function, and the blended data are used to set a corresponding single local site condition.

If desired, to lessen intrusion into an area of particular sensitivity, the locations of the remote site monitoring devices 32 and associated power and communication cabling to them are camouflaged such as by using natural support features of the remote site 10 instead of the mounting pole 42.

Figure 8:
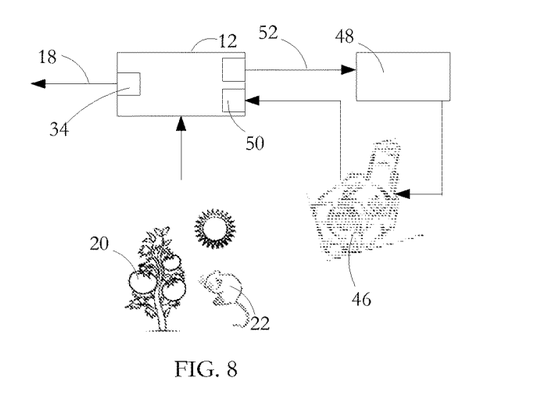
FIG. 8 shows an adaptive form of remote site monitoring using cameras according to an embodiment of the invention.

As depicted in FIG. 8, a camera 46 is a valuable monitoring device, particularly for a remote, inhospitable or environmentally sensitive area such as, for example, a rain forest or a coral reef. The camera 46 has a controller 48 which provides scanning capability so that locations at different directions, azimuth and depth of focus can be monitored according to an imposed camera control. For automatic operation, the camera 46 is connected to a transceiver for sending image data to image analysis equipment 50 at the local site 14 or at a separate image processing facility. Image analysis software 50 has particular value in detecting in the received image data characteristics such as presence, frequency and health of particular species of flora and fauna. Such image analysis software can, for example, detect the presence of a mouse like Mickey. This is achieved by having the image analysis software 50 search the image data for a mouse-like shape and colour and for mouse-like movements. The image analysis software and associated processing software can further include a functionality to detect whether a feature identified as a mouse is actually Mickey. The image analysis software can further include a functionality to detect how many mice are detected by the camera (or set of linked cameras) over a certain time period and area of the remote site. The image analysis software can further include a functionality to determine—perish the thought—that Mickey has not been viewed for a certain period of time and has probably left the remote site or has left this life.

Similarly, the image analysis software 50 can include functionality that searches for particular plant species on the basis of such conditions as plant height and breadth, leaf colour, shape and size, flower colour, shape and size, stem colour and form, motion of the plant in wind, etc. Software for image identification of plant or animal species uses stored reference data corresponding to image templates of that type of plant or animal (or a particular component of it) including data related to its size, shape, colour, texture and movement. Image analysis in one embodiment of the invention operates in real time and, upon detection of a pattern of interest, a feedback loop is used to adjust control to the corresponding camera. For example, the camera is controlled so that it tracks an object identified as probably a mouse, or generates an image of that object at greater magnification or resolution.

The appearance of an animal hitherto unseen at the remote site normally signifies a relatively drastic change in the remote site environment. This and any other drastic change is detected by the image analysis software to trigger an indication that such a change has occurred to enable added focus to be placed both on collection of particular remote site conditions data and corresponding local site response.

A camera 46 can be operated continuously or triggered to start streaming video from the remote site 10 when requested by a prompt from the local site 14 or from a third location requesting video data. In continuous mode operation, image analysis software is used to identify changes over time in viewed image data. Recognition software is then used to estimate the nature of macroscopic changes occurring at the remote site, the onset of significant changes then triggering specific viewing of the video feed by an operator. A remote site camera system can have more or less sophistication allowing for any or all of common camera techniques such as panning, close-ups, freeze frame, etc.

Conditions data from cameras 46 and other devices 32, 44 are digitized for transmission and analysis. The data are multiplexed from the different monitoring devices with metadata identifying which condition are being measured, time and place of measurement, etc. Time and place data can be GPS derived. The data can be transmitted over a dedicated or public transmission link which may be wireless or wired and may include the Internet.

Figure 9:
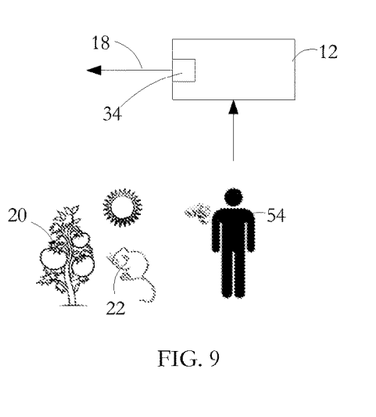
FIG. 9 shows yet another form of remote site monitoring using manual intervention according to an embodiment of the invention.

Automatic monitoring devices 32, 44 such as those shown in FIGS. 1-8 are valuable as they do not need manual attention except for service and repair. However, such devices are robotic and so remote site conditions data obtained from them may lack an important element, either because the devices are inherently incapable of monitoring that element or have not properly been programmed to monitor it. In these circumstances, as depicted in FIG. 9, there is no substitute for an observant person 54 at the remote site 10 who, in deploying the remote site monitoring devices 32, 44 and/or additional portable monitoring devices (not shown), brings intelligent perception to observations made and measurements taken at the site. Such a person can then generate manually derived remote site conditions data either as an alternative or an adjunct to remote site conditions data derived from the automatic monitoring devices. The manually derived remote site conditions data are then used in the generation of local site conditions as previously described.

Figure 10:
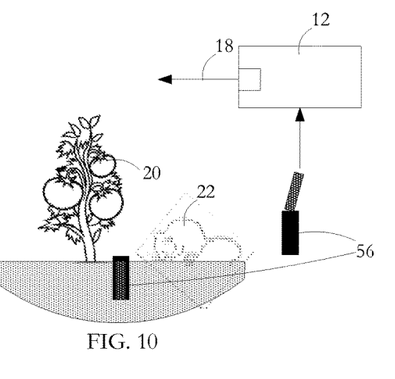
FIG. 10 shows another form of remote site monitoring using manual intervention according to an embodiment of the invention.

Manual intervention is particularly valuable when seeking to monitor below-ground remote site conditions as it enables remote site core samples to be taken as shown in FIG. 10. The core samples are subjected to physical and chemical analysis to determine ground conditions including, for example, the nature of inorganic composition such as mineral content, and the nature of organic composition such as insects, microbe content, etc. Below-ground conditions of a remote site may change relatively little over time, especially in the case of inorganic content. For example, erosion and leaching of material occurs over a long period of time. Drastic change such as that caused by fire or flooding typically occurs rarely and intermittently. Below-ground organic content changes more quickly and regularly, but even that has more of a seasonal change than the daily change of above-ground conditions such as wind and light.

At a particular remote site monitoring device 32, 44, a signal is generated which shows change in the condition over time. In one example, measurement is made essentially continuously for a condition such as sunlight, where the amount of sunlight can change markedly from one moment to the next, for example, when the sun becomes covered by a cloud or when a cloud moves out from covering the sun. In another example, measurement is periodic for a condition such as air pressure which does not change markedly from one moment to the next, but which may undergo appreciable change in the course of a day. In a further example, measurement is made intermittently and infrequently, for example, for a condition such as tree canopy cover or ground content which change relatively little from one day to the next. For rapidly changing physical phenomena, remote site monitoring is best achieved with automatic, unmanned remote site detectors 32, 44, with output data generated and streamed to the communication network 18. Conditions that typically change very slowly may best be monitored through discrete observations and tests made during a site visit.

Figure 11:
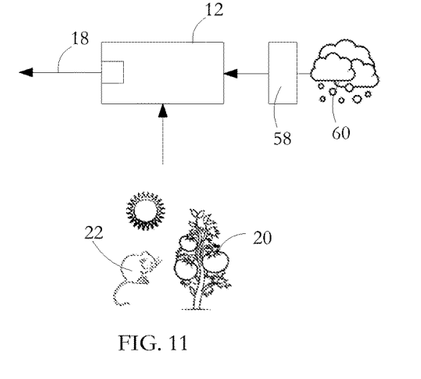
FIG. 11 shows another form of remote site monitoring using a supplementation input generated from a location separate from the remote site.

As indicated previously, remote site conditions are, in one embodiment of the invention, monitored by automatic devices 32, 44 and/or by a person 54 at the remote site. In an alternative embodiment as depicted in FIG. 11, some or all of the remote site condition data is generated by a commercial or community weather reporting or forecasting service such as WeatherStar™ which generates local weather reporting and forecasting information for viewing on cable television. Clearly, such weather reporting data will not accurately or fully reflect the conditions of a particular site located within the weather reporting area, but it will provide gross indicators, such as temperature, humidity, pressure, current precipitation, wind strength and direction for the area containing that particular site. Other comparable systems generating such localized weather data for Internet website display may also be used as a site conditions data source.

In another variation, actual data transmitted from a remote site comprises or is supplemented by weather service information or other information generated at a sub-system 58 and based on conditions at a third location 60 away from the remote site 10 but pertinent to it. The remote site data, either as the sole remote site data or in combination with other remote site data are then used as the basis for setting local site conditions. In one instance, the third location 60 is that of an orbiting satellite which is used in combination with the sub-system to compile and/or forecast weather conditions which have occurred, or are occurring, or are forecasted to occur, at the remote site 10. Inevitably, such data may not accurately reflect actual site conditions because of lack of resolution and specificity of generally available satellite data. However, the third location data are useful if the remote site conditions data are difficult to obtain or are temporarily unavailable for some reason. Such data are valuable also for initiating advance setting of local site conditions on the basis of a reasonably predicted, satellite-derived weather forecast for the remote site region.

As previously explained, a signal containing the remote site data is transmitted over a dedicated or public transmission link 18 which may be wireless or wired and may include the Internet. At the receiver 36 which may be at the local site or at another location, the remote site signal is received and decoded. Data corresponding to the monitored remote site conditions are then derived and are used to set the local site conditions.

At the local site is the life forms chamber 28 which has some level of isolation from its surroundings. The chamber 28 may take any of many forms but, in each of them, an environment is maintained to support the growth of life forms under conditions which, to a significant extent, reflect or depend on the monitored conditions of the remote site 10. In one embodiment, other than certain inputs and monitoring probes to be described presently, the interior of the local site chamber 28 is sealed from the external environment surrounding the chamber so that conditions within the chamber are maintained substantially independent of surrounding conditions. The chamber 28 may be relatively small, for example, of a size to be maintained as a recreational feature in a domestic residence. Such a chamber can take any of a variety of forms and sizes, but will generally contain only flora and small organisms which generally do not require roaming room or diverse and dispersed food sources. Such a chamber may be made of a size to fit a particular venue, such as a room of a house, where its presence may take a part of the room volume without making the room unserviceable. The chamber 60 may alternatively take the form of a whole room in the manner of a greenhouse. As indicated the level of isolation from the surroundings depends on the degree to which adulteration of the interior of the chamber by the presence of exterior influences can be contemplated. At one extreme, the chamber is hermetically sealed. At the other, the local site may be essentially open to the surroundings but with some rudimentary separator—for example, a ditch—to provide a distinction between the local site and the surroundings.

Figure 12:
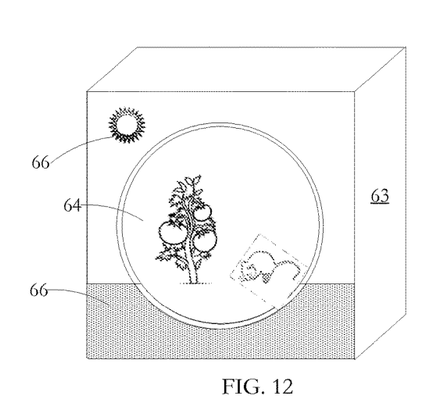
FIG. 12 shows one configuration of local site according to an embodiment of the invention.

In one embodiment, the chamber is a standalone unit much like an aquarium but with all of its sides sealed and with inputs and monitoring probes extending through one or more of the sides. Another example of chamber is implemented within a hollow section of a wall 63 with part of the wall being transparent. Such a wall section is shown in FIG. 12, the chamber located within an area of the wall which has been decorated as shown at 66 in the style of a mural to form a visual extension of the chamber 28.

In one exemplary embodiment, the chamber itself has a confining wall 68 which may be a single wall in the case of a spherical chamber or consist of several sections sealed to one another and determining the chamber shape. Because the chamber 28 is typically used to display life forms within it to a viewer outside it, at least part of the wall is composed of transparent glass or plastic. The transparent wall 68 enables the interior of the chamber 28 to be viewed by a person 30 positioned close to the chamber 28 as shown in FIG. 1. The transparent wall section chamber 64 may allow light to enter the chamber if it is desired that all or part of light in the chamber should come from outside it. Alternatively, the wall, or part of it, is made of one-way glass so that the chamber interior is viewed from outside, but life forms in the interior are not disturbed by outside movement or by light from outside the chamber other than that deliberately introduced by appropriately configured light sources.

Figure 14:
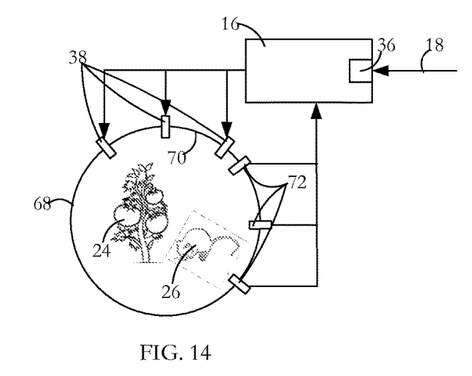
FIGS. 14 and 15 show another configuration of local site according to an embodiment of the invention, the views showing such local site with a number of exemplary inputs.
Figure 15:
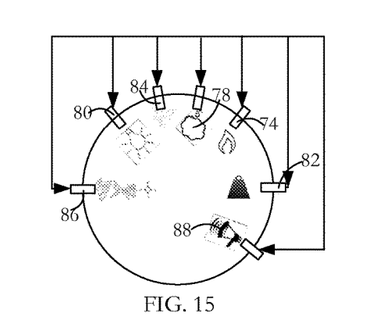

As shown in FIGS. 14 and 15, other parts 70 of the wall 63 have a structure and strength suitable for mounting generator units 38 for setting local site conditions and monitoring units 72 for monitoring such conditions. Local site generator units 38 may include, by way of example but not limitation, heaters, coolers, humidifiers, dehumidifiers, wind generators, pressurizing units and depressurizing units. The monitoring units 72 are used to determine whether a particular property is at the desired level or has the desired characteristics with specific generator and monitor units 38, 72 connected in control and feedback circuits. Thus, for a property such as temperature which may be rising at the remote site, the temperature change generating unit—a heater—is energized to heat the chamber interior. One input to the heater is derived from the remote site data and a second input is derived from a thermostat located in the chamber. Most local site generating units 38 are implemented in a circuit having a feedback loop to ensure that a particular generating unit obtains and maintains a desired condition at the chamber 28.

One exemplary chamber 28 is of polyhedral form with glass wall sections for viewing the chamber interior and other wall sections for mounting the generator and monitoring units. Because a generating unit for setting one local site condition may influence another local site condition, the local site is really a dynamic, compromise system where typically local site conditions will regularly and inadvertently drift from their desired level and so need periodically to be corrected. To fully emulate the conditions of the remote site at the local site is very hard owing to the many conditions that must be matched and owing, too, to underlying physical phenomena interacting differently at the remote site compared with the local site. To obtain a rough match of remote site conditions at the local site, only a few of the conditions that most affect the appearance of the chamber and its life forms are monitored at the remote site and set at the local site. Closely emulating remote site conditions at the local site is expensive because a large number of conditions must be monitored at the remote site and set at the local site.

The local site chamber is initially empty and is stocked with foundation materials. In larger chambers such as zoo pens or safari parks, stocking is impractical and so preparation is an adjustment of initially present terrain conditions. For example, chemicals are added to the earth to change pH level. Plants at the local site which are of a species not present at the remote site are uprooted. Plants of a species present at the remote site, but not initially at the local site, are planted.

The chamber interior has a below-ground part and an above-ground part. The below-ground part has a top layer of soil suitable for growing the remote site species of plants, and a drainage system. The soil may be as available in the local site neighbourhood or may be carefully prepared soil having soil content and condition matching remote site soil. Soil is carefully matched, for example, if the remote site plant is sensitive to the nature of the soil in which it must grow in comparison with a hardy species which can grow in a variety of soils. The soil may be also matched if it has a distinctive visual feature. The local site soil can have components that are chosen to match the content and appearance of the remote site soil, including, for example, moisture and microbial content. The above-ground part can also be simply matched to remote site conditions as, for example, by air temperature and humidity, with the plants in the chamber otherwise subjected to locally prevailing conditions of, for example, ambient light, air pressure, etc. Or the air condition may be a closer match to the remote site air conditions. The setting of start conditions in the chamber can be made as simple or complex as desired in terms of matching of local site conditions to corresponding remote site conditions.

The life forms introduced into the chamber may have a single focus life form or several. For larger chambers, numerically more life forms with a greater variety can be contemplated to get as close as possible to matching the life form content of the remote region, if that is what is desired.

Remote site data are analyzed to determine data related to each of the monitored remote site conditions, the time and place of its measurement, etc. The corresponding property of the chamber, for example interior temperature, is measured and a comparison is made of the chamber interior temperature and the remote site temperature. If the remote site temperature differs from that inside the chamber, a heater or cooler is energized to heat to bring the chamber temperature to that recorded at the remote site. If a number of related temperature measurements are monitored at the remote site, for example at different lateral or height locations, more than one heater/cooler is energized so as to establish a matching area/height temperature profile at the local site.

A suitable local site heater/cooler system 74 may be any of a number of known types and can for example be an adaption of known systems used to control the temperature of homes. Because heating and cooling can have an effect on the air humidity, the heater/cooler system control is linked to humidifier/dehumidifier system control.

A suitable local site humidifier/dehumidifier system 78 may be any of a number of known types and can for example be an adaption of known systems used to control the humidity of homes.

A suitable local site light system 80 may, for example, be based on any of a number of known types of grow lights such as those capable of emitting full spectrum light covering the electromagnetic spectrum from infrared through near-ultraviolet, this being light in the range that is needed by most flora and fauna to live and flourish. The identity and capabilities of the grow lights used are selected to be able to emulate, to the extent possible, the range of sunlight (and moonlight) experienced at the remote site both in terms of daily variation and seasonal variation. Such lights are arrayed, and their emission controlled, to most closely represent the incidence of light at specific times and places at the remote site. The grow lights can be used with suitable reflectors that assist in emulating the pattern of sunlight at the remote site. The grow lights can be supplemented by channeled natural sunlight received at the local site, provided the local light is modified as necessary to meet the character of light at the local site that is what is desired. In operation, a grow light array is controlled to provide more intense light to match periods of intense sunlight at the remote site and is turned down or off to match overcast or night conditions at the remote site. Grow lights having different spectral content can be switched in or out to match changes in received spectral content at the remote site depending, for example, on time of day, latitude and atmospheric conditions. If desired, the bulb array at the local site is moved or different bulbs are switched in or out to emulate tracking of the sun across the sky at the remote location.

A suitable local site pressure setting system 82 includes a pump for applying air pressure or suction at a port in the chamber defining wall. Resulting flow of air into or out of the chamber is limited by the use of baffles. The pressure setting system is integrated with other systems such as those for temperature, humidity and wind generation, so that conditions other than pressure are not undesirably altered. The system also includes a local site barometer to measure internal pressure of the chamber so that application of pressure or suction can be reduced, terminated, or reversed to ensure that the internal pressure of the chamber is maintained at the desired level.

A suitable rainfall emulator system 84 can use sprinklers with pressure and nozzle adjustment so as to enable selection from a range of rainfall types. Rain fall at remote sites may vary widely as a function of global position. A simple rainfall emulator can be chosen for a limited range of rainfalls or can be made more complex for simulating a wide range of rainfalls. In this respect, the main characteristics of rain are:

Drop size. May vary from small mist-like droplets, through average drop diameter of about 2.5 millimeters, to maximum drop diameter of about 6 millimeters.

Drop distribution in terms of drop size. Moderate climate cyclonic rain has relatively uniform small to medium drop size. Tropical storms spawn a larger proportion of large drops.

Terminal velocity (depending on drop size) is up to 9 meters per second.

Kinetic energy. Mass×velocity squared.

Rainfall intensity is total rain over time. Typically up to 25 mm/h in moderate zones, up to 75 mm/h in tropical zones.

A suitable wind emulator 86 can use adjustable directional fans. A suitable sound emulator 88 can use speakers serviced by a range of possible sound sequences of a type that might be expected at the remote site including weather noise and noises of resident fauna.

The inputs to the local site generally need electrical power. A local site controller, inputs and probes, in one embodiment, have a battery back-up which, for example, replicates conditions for an immediately prior 24 hour period in case of power outage.

Both the remote site and the local site have habitat and life forms that are, in each case, part of a complex interactive whole. Regardless of the efforts made to mirror at the local site conditions that exist at the remote site, the sites inevitably evolve in different ways. This may arise for, example, from local site stimuli that are not intentionally imposed, and/or from activity at the remote site that has not been monitored and, therefore, not emulated at the local site. Or it may arise simply because the response of one organism to a set of stimuli or conditions may not be the same as the response of another, like organism. Consequently, following a period of time, the local site may no longer sufficiently match the remote site to represent a desired facsimile of the remote site. If substantial mirroring is desired, it may become necessary to perform restoration of the local site to remove elements that have developed that are really not representative of the remote site. For example, an initial distribution and frequency of plant types has evolved so that all but one species have died out and the local site has become essentially a monoculture. Restoration may also be needed if the health of the local site deteriorates such as, for example, by inadvertent introduction of moulds.

While the illustrated embodiments of the invention show terrestrial sites, other environments are contemplated such as marine or pond sites. Although the remote site and the local site are in the illustrated embodiments of comparable size, the local site can be smaller than the remote site. In this case, some or all of the remote site conditions data can be "condensed" before it is used to generate the corresponding local site conditions. Condensing can take any of a number of forms. For example, for several temperature measurements made over the volume of the remote site, an average may be used to generate a single temperature condition at the local site. In another example, conditions monitored over a fraction of the volume of the remote site are used in generating the local site conditions. Similar modifications can be made if monitoring at a small site is used to implement conditions at a larger local site. In this instance, for example, the conditions of the smaller remote site can be iterated over the several parts of the larger local site.

The nature and number of activities monitored at the remote site and corresponding influences imposed at the local site vary depending on the degree of mirroring desired. In a simple system, for example, the local site is set up to have roughly the ground constitution of the remote site and with reflected conditions limited to temperature and humidity. This is a relatively easy system to handle from the viewpoint of matching the conditions of the remote site and the local site. Clearly, other influences such as pressure and rainfall can have a major effect. At the local site, these other influences can be imposed as a standard regime so that the local site mirrors some conditions of the remote site, but not others. At the other end of the scale, highly complex systems are set up at the two sites. For example, instead of measuring rainfall, the type of rainfall is detected at the remote site including, for example, drop size and concentration. The corresponding complexity is implemented at the local site using a sprinkler system having nozzles, pressure and pulse rate to mirror to the extent possible the remote site rainfall type. Another complex system is the air at the remote site. Gas and particle detection instruments known, for example, for identifying pollutants are utilized at the remote site to identify trace amounts of gases such as ozone or carbon dioxide, and to measure particle content. Other detectors can be used for identifying dissolved gases that end up in ground water. The detection of trace amounts of gas and dust elements in the air requires an equally sophisticated set up at the local site to introduce corresponding trace amounts of the gases and dust elements into the local site chamber. In one variation, the local site is controlled so as not to permit extreme conditions to be generated even if they occur at the remote site. For example, conditions emulating storms or extremes of temperature are prevented. In another variation, the local site carer, if he or she becomes aware of poor weather conditions at the remote site, has the ability to provide an override control to switch off direct monitoring and emulation of the remote site until the poor weather conditions have abated.

It is considered that the invention has primary application as a decorative device; something literally to bring another piece of the world to life. This might have particular nostalgic value if a viewer at the local site wishes to be reminded of surroundings she has previously enjoyed.

Figure 16:
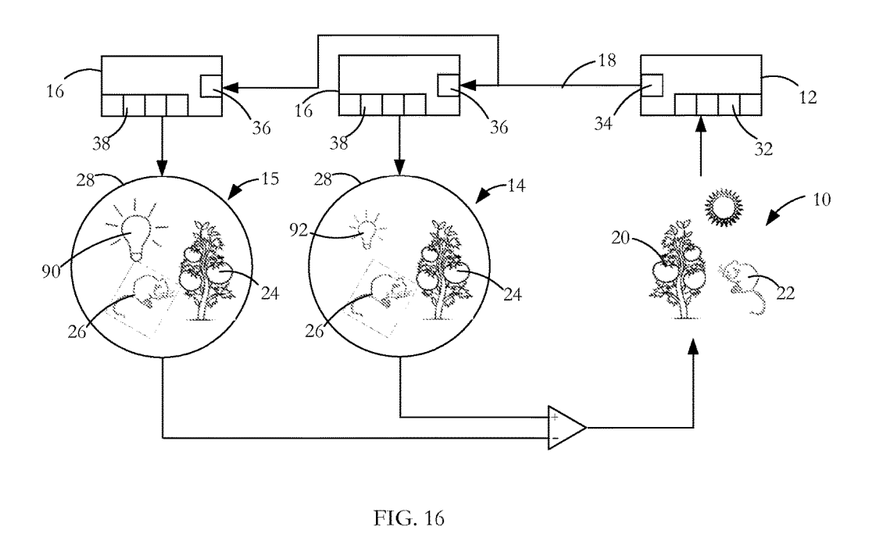
FIG. 16 is a schematic view of apparatus according to another embodiment of the invention particularly adapted for scientific experimentation.

The invention may however find more serious application in scientific study. In a further embodiment of the invention particularly adapted for scientific experimentation, as shown in FIG. 16, two local sites are set up: a control local site 14 and an experimental local site 15. The system is operated as previously described to match as accurately as possible every environmental condition of the local sites 14, 15 to the environmental conditions monitored at the remote site 10. Once a stable match is achieved, an environmental condition is deliberately changed at the experimental local site but not at the control local site. As shown in FIG. 16, the amount of ambient light 90 over a period of time in the experimental site 15 is made larger than the amount of ambient light 92 over the same period in the control site 14. In this way, environmental conditions at the experimental local site 15 differ in a controlled and specific way from the corresponding environmental conditions at the control local site 14 and the remote site 10. Target life forms of the same species present at each of the local sites 14, 15 are then monitored to see if there is a resulting change in species condition in the experimental local site 15 which is not present in the species in the control local site 14. As indicated by the comparator 94, such a resulting change may be a beneficial or a detrimental change and may, for example, be a change in health, size, fecundity, etc. Based on these findings, a corresponding change in the environmental conditions present at the remote site 10 is implemented with a view to effecting change at the remote site such as improving the habitat for a particular species. The local set up becomes, in effect, an experimental farm or zoo from which useful results applicable to the remote site can be obtained without (or with a reduced) need to travel to the remote site and without needing to intrude on or disrupt the remote site once original monitors have been installed.

Figure 13:
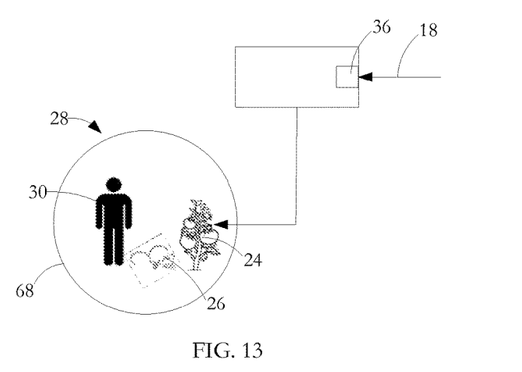
FIG. 13 shows another configuration of local site according to an embodiment of the invention, the local site containing a viewer.

There is no conceivable limitation on the conceivable size of the remote and local sites. It is a matter of how difficult it is to install and handle the complex monitoring and generating sub-systems required at the respective sites. To emulate even a small slice of a fauna-containing environment, a large chamber is required to permit animals the freedom to roam and a food chain. In this respect, such a chamber may be comparable in size to a zoo pen, a safari park, or the structure featured in the movie, The Truman Show. Of particular interest, as shown in FIG. 13 is a local site in which a person 30 can rove to fully immerse herself in the flora and fauna inhabiting the local site. Somewhat more fancifully, the local site could be an island or a planet.

The exemplary systems and methods described in this specification involve data gathering and data processing and generating control signals based on the processed data. While data gathering necessarily takes place at one or other of the remote and local sites, data processing and the generating of control signals can, if more convenient, take place either at the relevant sites or at a location or locations other than the remote and local sites with outputs as appropriate being then routed to the remote and local sites.

Other variations and modifications will be apparent to those skilled in the art. The embodiments of the invention described and illustrated are not intended to be limiting. The principles of the invention contemplate many alternatives having advantages and properties evident in the exemplary embodiments.

What is claimed is:

1. A system comprising a monitoring sub-system for monitoring states of a plurality of environmental conditions at a remote site, a communication path for communicating in a direct real-time response to the monitoring the states of the remote site environmental conditions to a control sub-system, the control sub-system configured to generate corresponding states of a corresponding plurality of the environmental conditions at a local site in direct real-time response to the communicating of the communicated states such that the states of the local site environmental conditions substantially match the communicated states of the remote site environmental conditions, and a habitat at the local site for growing a life form at the local site, wherein the monitoring subsystem further includes at least one probe adapted for use in measuring at least one of frequency of identified life forms and health of identified life forms at the remote site.

2. A system as claimed in claim 1, the monitoring sub-system including a timer configured so that the monitoring sub-system monitors the remote site environmental conditions over a time period that is one of continuous, periodic and intermittent.

3. A system as claimed in claim 1, wherein the monitoring sub-system is at least one of a person, equipment on the remote site for automatically monitoring the remote site environmental conditions, and equipment off the remote site for automatically monitoring the remote site environmental conditions.

4. A system as claimed in claim 1, wherein the monitoring subsystem includes at least one probe for use in measuring the state of an above-ground condition the probe adapted to measure at least one of temperature, humidity, precipitation level, precipitation type, light intensity, light direction, light spectral content, pressure, composition, wind or flow direction, wind or flow speed, turbulence, sound, electric field, magnetic field, identity of life forms, and a drastic change being at least one of fire, flood, chemical inundation and biological inundation.

5. A system as claimed in claim 1, the control sub-system configured to receive forecast data applicable to an area containing the remote site, and to generate the states of the local site environmental conditions based, as least in part, on the received forecast data.

6. A system as claimed in claim 1, the local site including a chamber having inputs for adjusting environmental conditions in the chamber, the chamber having probes for monitoring environmental conditions in the chamber, at least some of the probes having outputs used to modify at least some of the inputs.

7. A system as claimed in claim 6, the chamber having an interior substantially sealed from an exterior thereof.

8. A system as claimed in claim 7, further comprising a wall dividing the interior from the exterior of the chamber, at least a part of the wall being transparent to allow viewing of contents of the chamber from outside the chamber.

9. A system as claimed in claim 1, wherein the local site is a control site and the life form is a first life form of a particular species, the control sub-system further operable to generate the states of the local site environmental conditions at an experimental site remote from the remote site such that the states of the local site environmental conditions at the experimental site are also generated in direct real time response to the communicating of the communicated states of the remote site environmental conditions so as to emulate said communicated states, the experimental site having a habitat for growing a second life form of the particular species at the experimental site, the control sub-system operable to generate a change in the state of one of the local site environmental conditions at the experimental site, and a comparator subsystem for comparing a property of the first life form at the control site to a corresponding property of the second life form at the experimental site to determine whether the generated change in the state of said one of the local site environmental conditions at the experimental site has an effect on the second life form.

10. A system as claimed in claim 9, further comprising a feedback loop from the experimental site to the remote site for implementing a change in the state of said one of the remote site environmental conditions corresponding to the change generated in the state of said one of the environmental conditions at the experimental site if the effect of the generated change on the second life form at the experimental site is determined to be a beneficial effect.

11. A system as claimed in claim 1, wherein the monitoring subsystem includes at least one probe for monitoring the state of an in-ground environmental condition.

12. A system as claimed in claim 1, wherein the monitoring subsystem includes at least one probe for monitoring the state of an in-water environmental condition.

* * * * *